United States Patent
Minh et al.

[11] Patent Number: 5,256,499
[45] Date of Patent: Oct. 26, 1993

[54] MONOLITHIC SOLID OXIDE FUEL CELLS WITH INTEGRAL MANIFOLDS

[75] Inventors: Nguyen Q. Minh, Fountain Valley; Thomas L. Stillwagon, Long Beach, both of Calif.

[73] Assignee: Allied Signal Aerospace, Morris Township, Morris County, N.J.

[21] Appl. No.: 613,430

[22] Filed: Nov. 13, 1990

[51] Int. Cl.⁵ .......................................... H01M 11/10
[52] U.S. Cl. .................................... 429/33; 29/623.3; 29/623.4; 429/127
[58] Field of Search ................... 29/623.3, 623.4; 429/33, 127

[56] References Cited

U.S. PATENT DOCUMENTS

| | | | |
|---|---|---|---|
| 3,476,609 | 11/1969 | Gelting et al. | 429/26 |
| 3,507,704 | 4/1970 | Webb | 429/19 |
| 4,444,851 | 4/1984 | Maru | 429/26 |
| 4,476,196 | 10/1984 | Poeppel et al. | 429/33 |
| 4,476,198 | 10/1984 | Ackerman et al. | 429/33 |
| 4,499,663 | 2/1985 | Zwick et al. | 29/623.1 |
| 4,510,212 | 4/1985 | Fraioli | 429/30 |
| 4,510,213 | 4/1985 | Schnacke | 429/36 |
| 4,590,135 | 5/1986 | Warszawski et al. | 429/38 |
| 4,604,332 | 5/1986 | Warszawski et al. | 429/38 |
| 4,604,876 | 2/1987 | Warzawski et al. | 63/32 |
| 4,648,955 | 3/1987 | Maget | 204/258 |
| 4,721,556 | 1/1988 | Hsu | 204/258 |
| 4,753,857 | 6/1988 | Hosaka | 429/38 |
| 4,758,481 | 7/1988 | Fauvel | 429/39 |
| 4,761,349 | 8/1988 | McPheeters et al. | 429/39 |
| 4,769,297 | 9/1988 | Reiser et al. | 429/17 |
| 4,799,936 | 1/1989 | Kiley | 29/623.1 |
| 4,816,036 | 3/1989 | Kotchick | 29/623.3 |
| 4,913,982 | 4/1990 | Kotchick et al. | 29/623.3 |

Primary Examiner—Mark L. Bell
Assistant Examiner—Willie J. Thompson
Attorney, Agent, or Firm—David B. Abel; Hugh P. Gortler; Robert A. Walsh

[57] ABSTRACT

Manifolds of a solid oxide fuel cell are integrally formed with the fuel cell's core. The fuel cell includes repetitively stacked anode, electrolyte, cathode interconnect gasket elements. The gasket elements space apart the interconnect and electrolyte elements and bound the anode and cathode elements. The interconnect, electrolyte, and gasket elements are provided with cutouts that define manifold passageways for the fuel and oxidant. The gasket elements further prevent the fuel from contacting the cathode elements and the oxidant from contacting the anode elements.

14 Claims, 6 Drawing Sheets

MONOLITHIC SOLID OXIDE FUEL CELLS WITH INTEGRAL MANIFOLDS

BACKGROUND OF THE INVENTION

The invention relates to solid oxide fuel cells and more particularly to a method of fabricating the manifolds therefor. A fuel cell is basically a galvanic conversion device that electrochemically reacts a fuel with an oxidant within catalytic confines to generate a direct current. In a fuel cell, cathode material defines the passageways for the oxidant and anode material defines the passageways for the fuel, and an electrolyte separates the cathode and anode materials. The fuel and oxidant fluids, typically gases, are continuously passed through separate cell passageways. The fuel and oxidant discharges from the fuel cell generally remove the reaction products and heat generated in the cell. The fuel and oxidant are the working fluids and as such are not considered an integral part of the fuel cell.

The type of fuel cell for which this invention has direct applicability is known as the solid electrolyte or solid oxide fuel cell, where the electrolyte is in solid form in the fuel cell. In the solid oxide fuel cell, hydrogen or a hydrocarbon fuel is preferably used as the fuel and oxygen or air is used as the oxidant, and the operating temperature of the fuel cell is between 700° C. and 1,100° C. The hydrogen passing through the fuel cell reacts with oxide ions on the anode to yield water, which is carried off in the fuel flow stream, with the release of electrons into the anode material. The oxygen reacts with the electrons on the cathode surface to form the oxide ions which then pass into the electrolyte material. Electrons flow from the anode through an appropriate external load to the cathode, and the circuit is closed internally by the transport of oxide ions through the electrolyte. The reaction process is well known and more thoroughly delineated in U.S. Pat. Nos. 4,499,663 and 4,816,036.

In practice, fuel cells are not operated as single units; rather, they are stacked in series. In a stack of cells, an interconnect connects anode of one cell to cathode of the next in electrical series to build voltage. Various configurations of fuel cells are depicted in U.S. Pat. Nos. 4,476,198 (Ackerman et al); 4,476,196 (Poeppel et al); 4,753,857 (Hosaka); 4,769,297 (Reiser et al): 4,770,955 (Ruhl); and 4,510,212 (Fraioli).

Cellular type fuel cell cores (see U.S. Pat. No. 4,476,198) of the prior art are made by the process whereby the compositions used for the four materials are put into four distinct slurries. Each slurry is then placed in a reservoir of a squeegee-type device which is pulled over a flat surface and hardens or plasticizes into a layer of the material having the desired thickness. In this manner the electrolyte wall or interconnect wall is formed by a first layer of anode material followed by a layer of either electrode or interconnect material and finally by a layer of the cathode material. The layers are bonded together since the binder system is the same in each layer.

Related U.S. Pat. No. 4,816,036 (Kotchick) teaches another method of forming a cellular core, whereby the compositions for the four materials are individually mixed to a plastic consistency and subsequently hot rolled into thin sheets. The thin sheets can then be hot rolled into multilayer tapes, formed, stacked, and fired as a monolith to produce the fuel cell with integral fuel and oxidant manifolding.

It should be particularly noted that the assemblies of the prior art references seek to construct fuel cells having multiple, stacked individual cells. The problem of manifolding the respective fuel and oxidant gases to the anode and cathode surfaces is generally ignored. In addition, external gas manifolds are often proposed which are fabricated separately from the fuel cell core. External gas manifolds thus require attachment to the fuel cell core and add stringent tolerance requirements for stack hardware design. Therefore, a fuel cell core design with integral gas manifolds is desirable.

SUMMARY OF THE INVENTION

An improved method of making a core and integral manifolding for a fuel cell comprises the steps of (1) individually mixing the anode, cathode, electrolyte, interconnect and gasket materials with a binder system; (2) forming thin tapes of the individual materials by either roll milling or slurry tape casting; (3) cutting and molding the respective green state tapes into the desired net shape elements; (4) assembling and bonding pairs of anode and cathode elements to opposite sides of either, or both, of the interconnect and electrolyte elements to form an interconnect stack and/or an electrolyte stack; (5) assembling and interbonding a plurality of the respective components in the sequential and repeated order of an interconnect element or interconnect stack, a formed anode element, an anode gasket, an electrolyte element or stack, a formed cathode element, and a cathode gasket. Sixth, densifying the assembled elements to form a monolithic core assembly.

BRIEF DESCRIPTION OF THE DRAWINGS

FIGS. 2 A, B, C, & D are perspective views of the components of an electrolyte element, an electrolyte element, a gasket element, and an interconnect element, respectively;

FIGS. 5 A, B, & C are exploded views of portions of alternative arrangements for the fuel cell core structure.

DETAILED DESCRIPTION OF THE INVENTION

Figure 1:
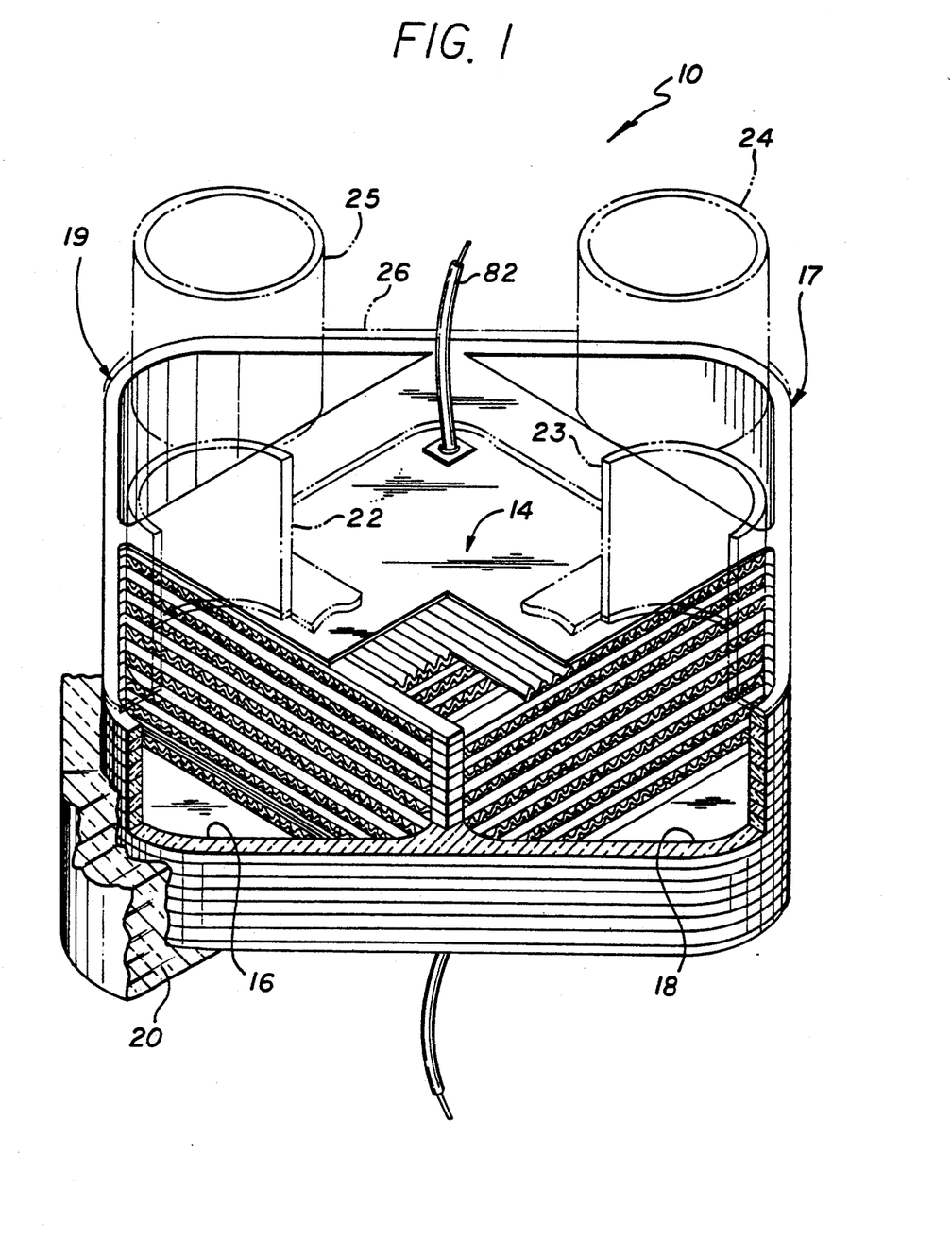
FIG. 1 is a perspective view, partially broken away for clarity of a solid oxide fuel cell formed according to the present invention.

FIGS. 1 and 2 show a monolithic solid oxide fuel cell (MSOFC) 10 including a fuel cell core 14 and fuel inlet and outlet manifolding 16 and 17, and oxidant inlet and outlet manifolding 18 and 19. The core 14 and manifolds 16, 17, 18, 19 are located within and surrounded by suitable insulation 20. Supply ducts 22, 23, and exhaust ducts 24, 25 (shown in phantom) connect the manifolds 16, 18, 17, and 19 respectively with suitable fuel and oxidant sources (not shown). The MSOFC 10 further includes a top plate 26 and bottom plate 28 (FIG. 6) which seal the manifolds 16, 17, 18 and 19 and provide attachments for the supply ducts 22, 23 and exhaust ducts 24, 25.

In the MSOFC 10, an anode 30 and a cathode 32 are first formed into a corrugated, backfolded or ribbed configuration and attached to opposite sides of a shaped electrolyte 36, to form an electrolyte element 42. The corrugated anode 30 and cathode 32 layers are arranged with the corrugations at crossing angles to one another, preferably at right angles. A pair of gasket elements 40, which are preferably identically shaped but rotated in orientation by ninety degrees, are placed on opposite sides of the electrolyte element 42. The gasket elements 40 each have a thickness equal to the total height of the formed anode 30 and cathode 32. Interconnect elements 38 are stacked and attached to the gasket elements 40, at opposite sides of the respective corrugations from the electrolyte element 42. A plurality of the stacked electrolyte elements 42, gasket elements 40, and interconnect element 38 form a complete core section for the MSOFC 10. The specific configurations of the respective elements and the preferred method of forming this MSOFC 10 are more fully discussed below.

Figure 2A:
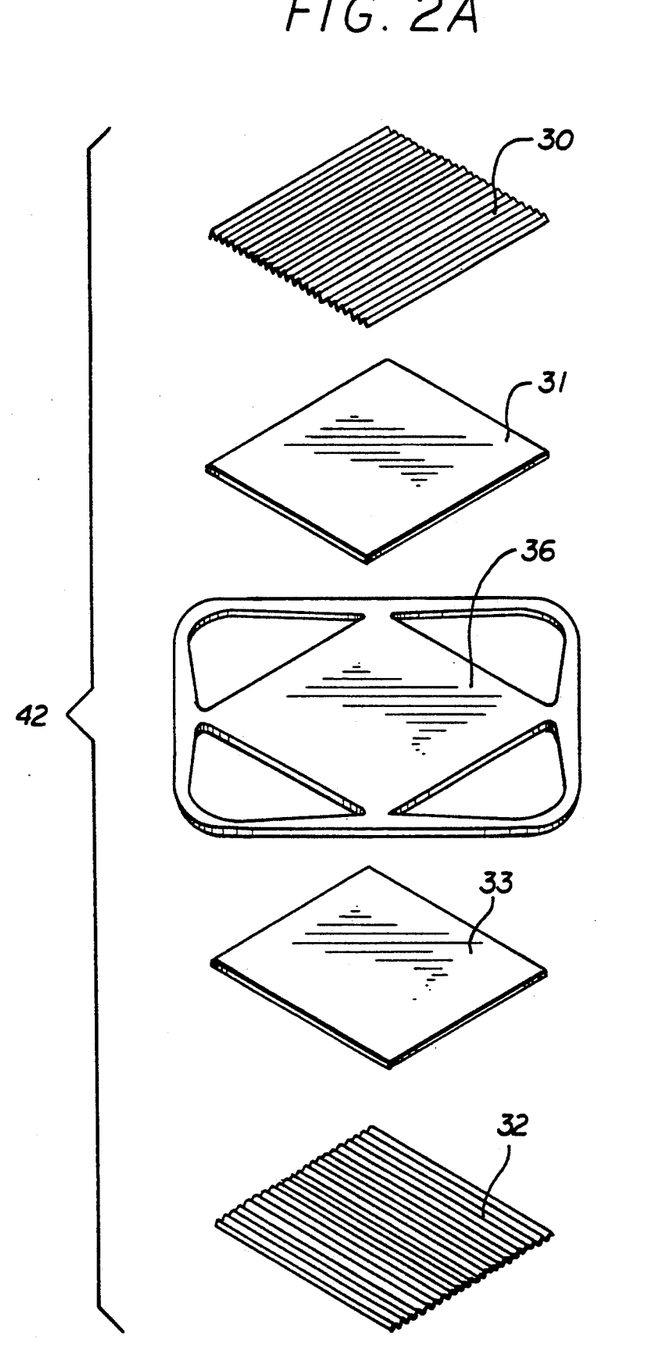
Figure 2B:
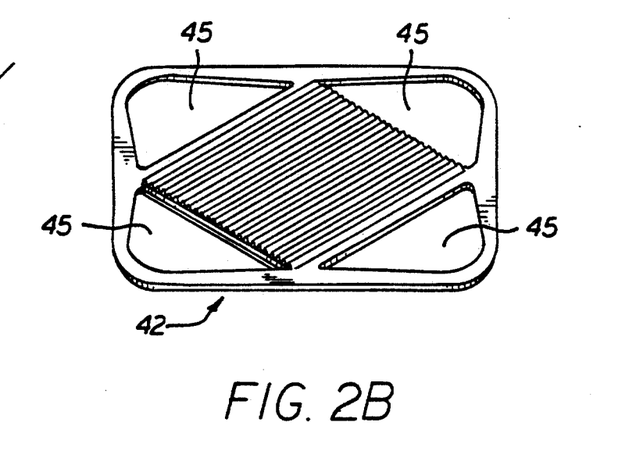
Figure 2C:
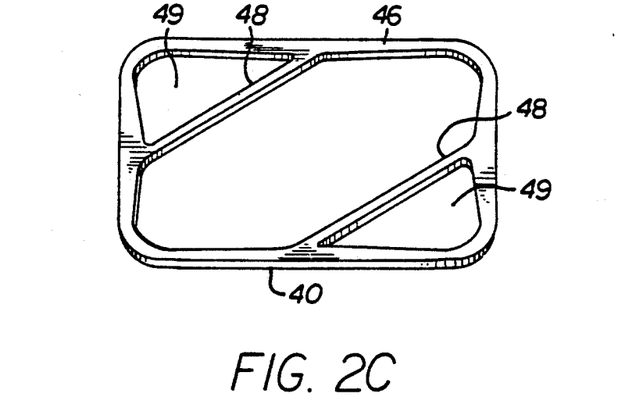
Figure 2D:
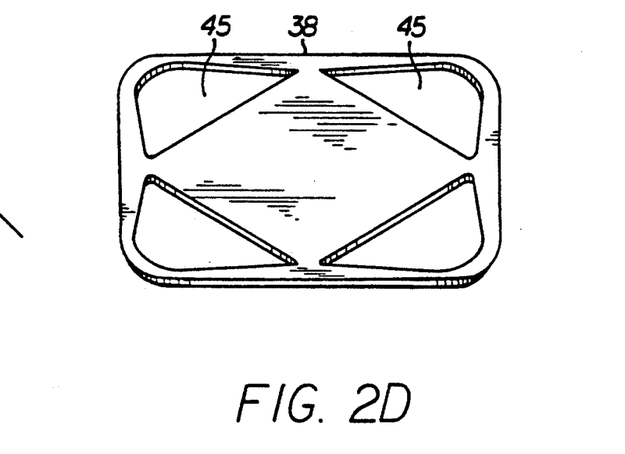

FIG. 2A shows a perspective view of the anode 30, cathode 32, and electrolyte 36 components which are combined to form the electrolyte element 42 of FIG. 2B. The gasket element 40 is depicted in FIG. 2C, and the interconnect element 38 is depicted in FIG. 2D. As depicted in these perspective views, the electrolyte elements 42, gasket elements 40, and interconnect elements 38 are all generally square in shape. In the electrolyte 36 and the interconnect element 38, a generally triangularly shaped cutout 45 is located proximate each corner of the square. The triangular cutouts 45 each have one of their corners and two sides oriented in alignment with, and set inside of, the corners and sides of the square. In this configuration, the triangular cutouts 45 align to form the manifolds 16, 17, 18, and 19, and the core section 14 is generally square in shape and rotated forty five degrees with respect to the outer shape of the respective elements 38, 42.

Figure 3:
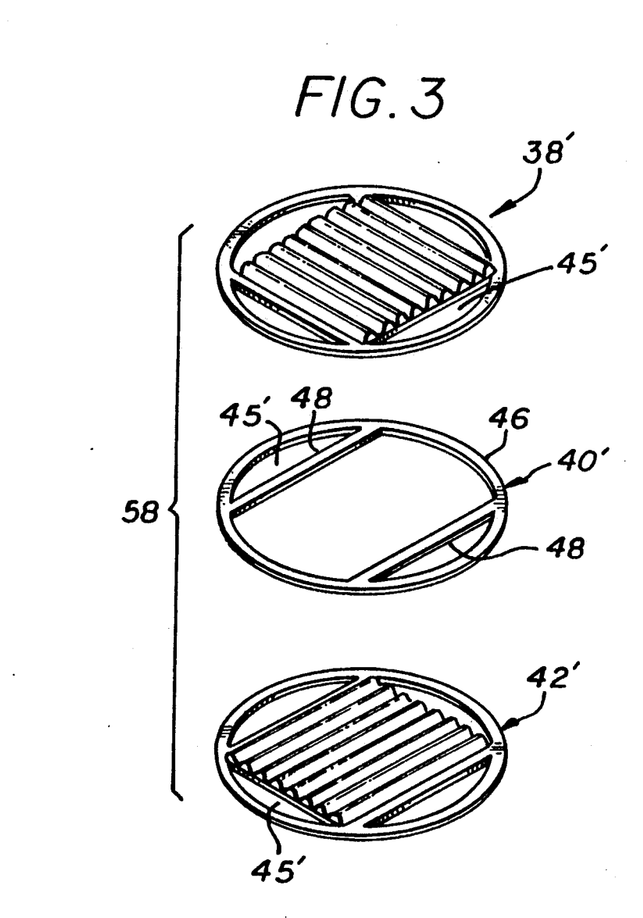
FIG. 3 is a perspective view of an alternative configuration for a fuel cell formed according to the present invention.

An alternative configuration for these individual components is depicted in FIG. 3, in which the an electrolyte element 42', interconnect element 38' and gasket elements 40' are depicted as having a generally circular outer configuration. In FIG. 3, cutouts 45' are generally part circular in shape, having a radius less than the radius of the component elements 38', 40', 42'. The cutouts 45' align to form the manifolds 16, 17, 18, and 19, and the core section 14 remains generally square in shape.

The gasket elements 40 or 40' of FIGS. 2C and 3 each include a peripheral rim section 46, and a pair of header bars 48. The header bars 48 are aligned in parallel, and define a pair of cutouts 49 which match the shape of two of the cutouts 45, 45' in the electrolyte and interconnect elements. The header bars 48, for a gasket element 40 assembled on the cathode side of the electrolyte element 42, prevent the flow of fuel in the manifolds 16, 17 from contacting the cathode 32 (or from mixing with the oxidant). Likewise, for a gasket element 40 assembled on the anode side of the electrolyte element 42, the header bars 48 prevent the flow of oxidant in the manifolds 18, 19 from contacting the anode 30.

Figure 4:
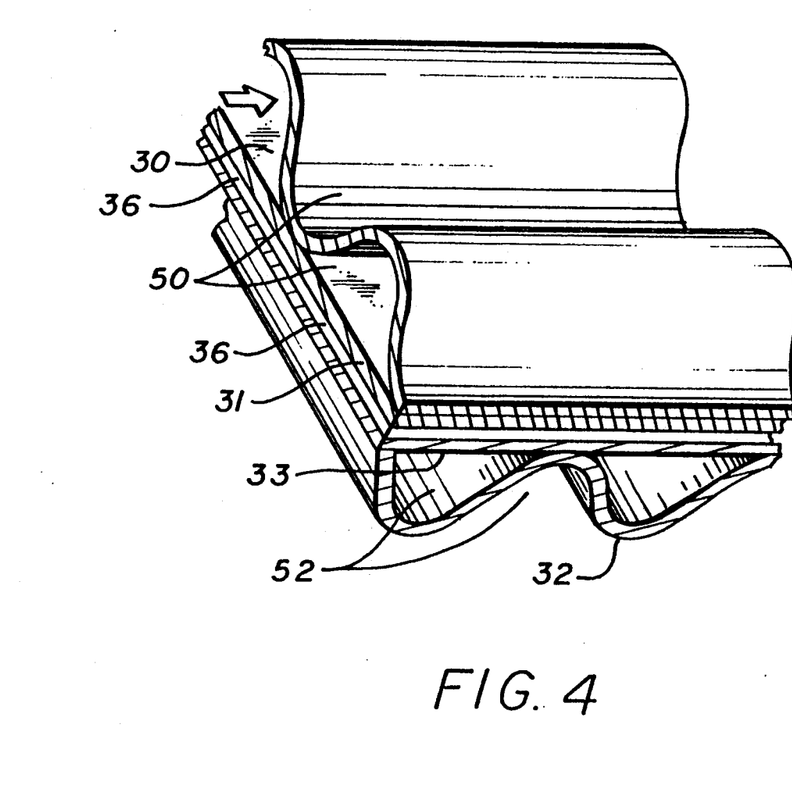
FIG. 4 is a partial, enlarged sectional view of a portion of the fuel cell of FIG. 1.

FIG. 4 depicts a perspective view of an enlarged cross sectional portion of the fuel cell core 14. In the enlarged view, the corrugations of the anode 30 and the cathode 32 are more readily apparent. The corrugations form fuel flow passageways 50, and oxidant flow passageways 52, in the anode 30 and cathode 32 respectively. Preferably, a thin layer of anode material 31 and a thin layer of cathode material 33 are deposited on the central portion of the surface of the electrolyte facing the respective corrugated anode 30 and cathode 32. This thin layer of anode and cathode material 31, 33, aids in the bonding of the corrugated anode 30 and cathode 32 to the electrolyte 36, while providing surface area for the electrochemical reactions to take place.

Figure 5A:
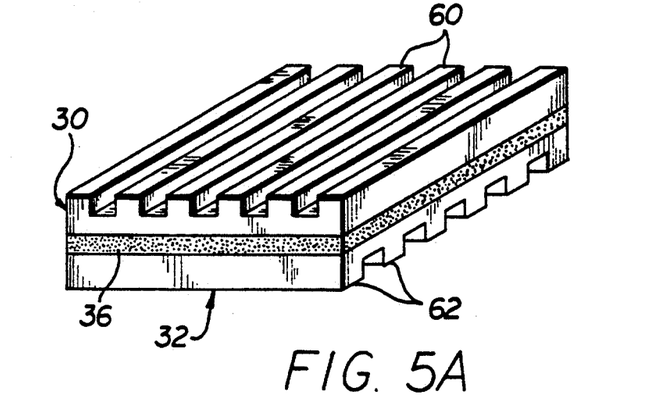
Figure 5B:
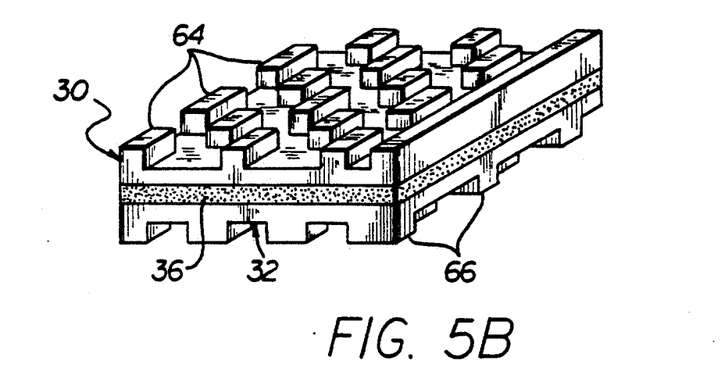
Figure 5C:
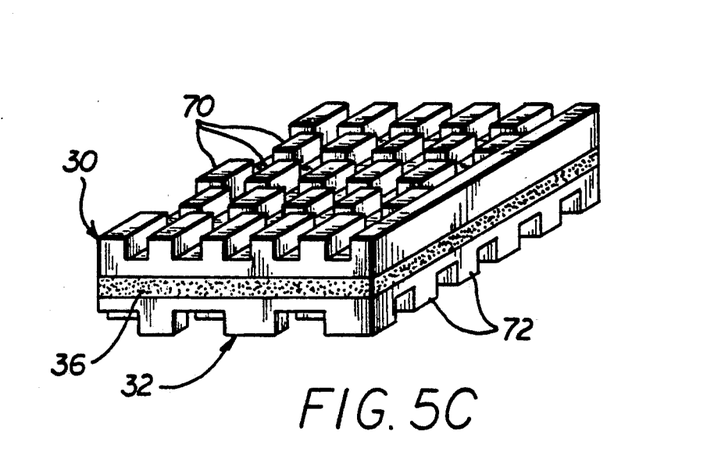

Alternatively, the MSOFC 10 may incorporate a configuration for the central or core section of the electrolyte element 42 as depicted in FIGS. 5 A, B, & C, wherein the electrolyte 36 is sandwiched between a formed anode 30 and cathode 32. FIG. 5A depicts an enlarged portion of the electrolyte element 42 wherein the anode 30 and cathode 32 include a plurality of aligned ribs 60, 62 respectively, which define the fuel passageways 50 and oxidant passageways 52. Other configurations are shown in FIGS. 5B and 5C, wherein the anode 30 and cathode 32 include fins 64, 66 respectively (FIG. 5B); or posts 70, 72 respectively (FIG. 5C). These ribs, fins, or posts are formed in the exposed surface of the anode 30 and cathode 32 by displacing contiguous portions of the respective surfaces of the anode 30 and cathode 32 from the plane of the pre-existing flat surface. As may be readily appreciated, the fins 64, 66 or posts 70, 72 may be so arranged as to force the respective fuel and oxidant to traverse a tortuous pathway along the surfaces of the electrolyte element 42. These alternative arrangements for the electrolyte element 42 can be used in either of the configurations of FIGS. 1 or 3.

The anode, cathode, electrolyte, interconnect and gasket materials are selected and modified to comply with the following requirements: (1) electrically conductive aspects of the cathode, anode, and interconnect; (2) the ionic transport aspect of the electrolyte; (3) the electronic insulation aspect of the electrolyte and gasket; and (4) the gas porosity property of the cathode and anode and the gas impervious property of the electrolyte, interconnect, and gasket. Likewise the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the invention, the interconnect and the electrolyte layers are thin (0.002-0.005 cm) while the sandwiching cathode and anode layers are perhaps the same thickness or possibly up to perhaps ten times this thickness (0.002-0.05 cm). The height or total thickness of the anode 30 and cathode 32 sections, i.e. including the corrugations or alternative spacing configurations, is preferably between 0.004-0.15 cm. The gasket elements are formed to an equal thickness as the total height of the anode 30 and cathode 32 sections. Thus the gasket elements 40 (and 40') have a thickness in the range of between 0.004-0.15 cm. It should also be noted that two interconnect elements 38 can define the limit of one cell unit 58. However in the overall MSOFC 10, two Accordingly, the total height of a cell unit 58 (including one half of the thickness of each of the two bounding interconnect elements 38) can be in the range of between 0.012-0.31 cm.

The electrolyte elements 42 electrochemically react the fuel and oxidant being conveyed in the fuel and oxidant passageways 50 and 52, respectively, to develop an electrical potential across the electrolyte 36. Further, for all of the electrolyte elements 42 thus confined between any pair of adjacent interconnect elements 38, there is an in-series electrical hookup of the cell units 58.

Still further, those skilled in the pertinent art will recognize that the electrochemically active fuel cell core of the MSOFC 10 is combined with conduits carrying fuel and oxidant to and from the fuel cell core 14, making a complete functional fuel cell when attached to electrical conductors 82, 84, and encased in the thermal insulation 20. The conductors 82, 84 extend through the insulation 20 to terminals (not shown).

Gaseous fuel is conveyed from a source (not shown) to the fuel inlet manifold 16 for flow through the fuel passages 50 cell core 14 toward the fuel outlet manifold 17. Likewise, oxidant is carried from a source (not shown) to the oxidant inlet manifold 18 for flow through the oxidant passages 52 toward the oxidant outlet manifold 19. The fuel and oxidant react electrochemically across the electrolyte element 42 separating the fuel and oxidant in the fuel cell core 14. Fuel and oxidant not consumed are discharged through the outlet manifolds 17 and 19, and subsequently may be combusted with the other reaction products from the MSOFC 10 in an appropriate combustion chamber (not shown).

PREFERRED METHOD OF FABRICATING THE FUEL CELL

Figure 6:
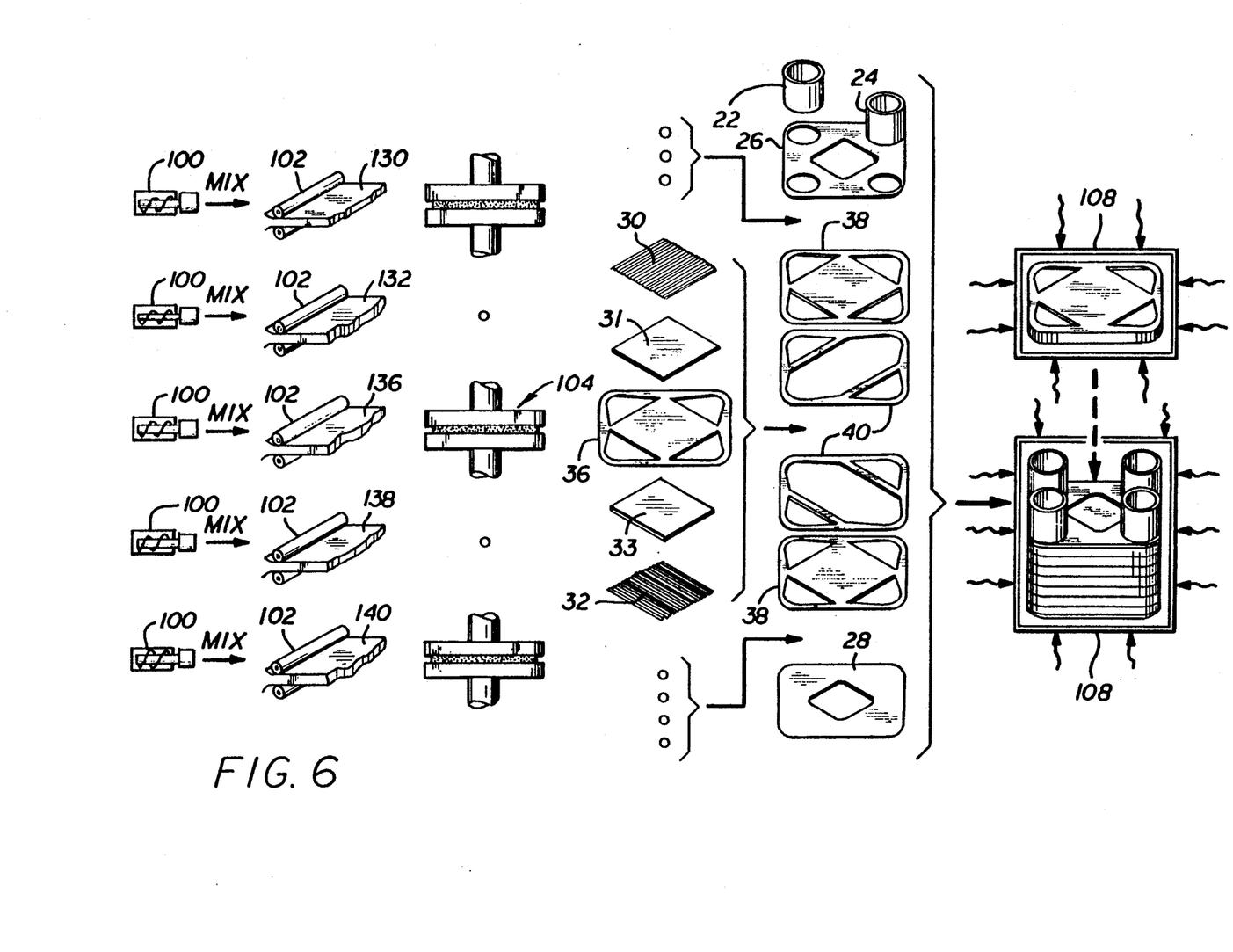
FIG. 6 is a diagrammatic depiction of the process required to form a fuel cell of the present invention.

Shown in FIG. 6 is a schematic diagram of the process for manufacture an MSOFC 10. Ceramic powders for each of the materials are first prepared. A cermet of cobalt or nickel metal with stabilized zirconia is used for the anodes 30, strontium-doped lanthanum manganite for the cathode 32, yttria-stabilized zirconia for the electrolyte lanthanum 36, chromite-doped with magnesium, calcium cobalt, or strontium for the interconnect 38 and zirconia for the gasket elements 40 top plate 26 and bottom plate 28. Particle size range from approximately 1 micron to 10 microns. The respective powders are then mixed with a desired binder and plasticizer in a high intensity mixer 100. For example, to form the electrolyte material, zirconia and yttria are mixed in approximate percentages of 87% to 13% by weight. The binder and plasticizer make up approximately 10%–40%, by weight, of the total mix and preferably approximately 18%. The amounts of binder and plasticizer being approximately equal. Porosity may be controlled by using larger sized particles, by the addition of pore formers, or by the use of the higher percentage of binder.

Typically, the binder used can be selected from the group of synthetic rubber, polyvinyl alcohol or polymer systems which thermally decompose without crosslinking. The plasticizer chosen is a pliable, elastic material that allows low temperature forming of the binder system, such binders include butyl benzyl phthalate, and solvents of the phthalate group.

The ceramic powder, binder and plasticizer are combined in the high intensity mixer 100 at room temperature. The mixing disperses the ceramic powder particles and coats each ceramic particle with binder. The mixing action also raises the temperature through friction to 150° C. and softens the plasticizer. Typically, the time for mixing can be 0.5 to 20 minutes with 10 minutes generally being preferred.

The mixed material is then removed from the mixer 100 and formed into tapes, preferably immediately after mixing to retain the heat generated by the mixing. As shown, the tape is formed by a roll mill 102. Alternatively, however, the tapes could be formed by other methods including extruding, pressing or tape casting. In the roll mill 102, each roller is generally heated to approximately 10° C.–150° C., depending on the material and the desired thickness, to assist in the rolling operation. Each material (the anode, cathode, electrolyte, interconnect, and gasket materials) is individually roll milled into tapes 130, 132, 136, 138, and 140 of the desired thickness. Next, the respective tapes are cut and pressed into a desired net shape in a press 104. These net shape pressings are green ceramics for the anode 30, cathode 32, electrolyte 36, interconnect 38 and gaskets 40. The net shapes include the walls for the manifolds 16, 17, 18, 19, as well as the header bars 48 for the gasket elements 40.

To provide passageways for the fuel and oxidant through the MSOFC 10, a plurality of fuel and oxidant passageways 50, 52 are formed such that they extend along the anode 30 and cathode 32 respectively. In order to increase the efficiency of the MSOFC 10, it is advantageous to form the passageways 50, 52 by corrugating the anode 30 and cathode 32 to achieve greater surface area. This can be accomplished during the pressing step, or alternatively in a subsequent vacuum forming or gear forming process. During this operation, it is important that tearing or deformation be prevented when removing the formed elements from the press 104, thereby retaining the desired element shapes and layer thicknesses.

Alternatively, for the configurations of FIG. 5, an electrolyte element 42 is formed by roll milling the anode tape 130, cathode tape 132, and electrolyte tape 136, cutting out generally square sections of the anode and cathode tapes 130, 132, and cutting out rectangular sections of the electrolyte tape 136, placing the anode square and cathode square on opposite sides of the electrolyte, and pressing the assembly to the desired net shape. As shown for example in FIGS. 5 A, B, & C, ribs 60, 62; fins 64, 66; or posts 70, 72; may be formed in the exposed surface of the anode 30 and cathode 32 respectively by displacing contiguous portions of the respective surfaces of the anode 30 and cathode 32 from the plane of the pre-existing flat surface. This may be accomplished by compression molding or by pressing, rolling, and cutting the anode 30 and cathode 32 surfaces. As may be readily appreciated, the fins 64, 66 or posts 70, 72 may be so arranged as to force the respective fuel and oxidant to traverse a tortuous pathway along the surfaces of the electrolyte element 42.

Next, a plurality of the electrolyte elements 42, gasket elements 40, and interconnect elements 38, including the anode 30 and cathode 32 on opposite sides, are sequentially stacked and bonded to one another. This is preferably accomplished by wetting the contacting surfaces of the elements with a solution which will partially dissolve the entrained binder and/or plasticizer within the elements. Preferably an isopropyl alcohol solution can be brushed or sprayed onto the elements to dissolve the binder. After the contacting elements are assembled, the alcohol solution evaporates and the binder joins the contacting surfaces. A complete MSOFC 10 can be assembled by repetitive stacking a number of the elements, for example over two hundred cells. The stacked assembly is then heat treated, preferably in a furnace or microwave oven 108 operating at temperatures of 1000°–1400° C., to sinter and densify the ceramics. By way of example, the assembly is heated at ramp rates of 10°–50° C. per hour to 1200° C. The temperature is maintained at 1200° C. for 1 hour, and then the assembly is allowed to gradually cool down. Microwave heating is preferably carried out at a frequency of twenty eight Giga-Hertz. In this heat treating procedure, the organics and volatile components are burned out or outgassed and the component materials (anode, cathode, electrolyte, interconnect, and gasket) are sintered to bond adjacent contacting surfaces. The top plate 26 and bottom plate 28 are attached either before or after the heat treating process.

Alternatively, the process of joining the green state elements may be limited to less than ten complete cell units 58, or only single electrolyte elements 42 and the two gaskets 40 on opposite sides thereof may be assembled in the green state. The elements are then heat treated according to the following two step process.

The respective elements or limited height stacks of elements are partially heat treated, preferably in a furnace or microwave oven 108, by any one or a combination of radiant, convective, or microwave heating to a temperature sufficient to sinter the respective anode, electrolyte, cathode and interconnect ceramics. During this heating process, the respective ceramic materials are preferably sintered to between twenty five percent to one hundred percent of their desired final density, as measured by the percentage of shrinkage during sintering. Alternatively, the heating process proceeds to a temperature sufficient to sinter the respective ceramic materials to a percentage of the desired final density for the respective materials such that subsequent heating and sintering will result in compatible shrinkage of all ceramic materials. The sintering temperature is selected to achieve the desired properties, including a dense electrolyte, porous anode and cathode, and dense interconnect. The interconnect elements 38, 38' as well as the gasket elements 40 and top and bottom plates 26, 28 may also be heat treated individually, to a temperature sufficient to sinter the ceramic materials to a percentage of the desired final density such that the ceramic materials will not diffuse into adjacent layers of the stacked array during subsequent heating and sintering of the stacked array. The electrolyte element 42, or the assembled electrolyte element 42 and gasket elements 40, may be separately heat treated as above. These heat treated components are then preferably allowed to cool to a temperature which allows handling.

This initial heat treatment may proceed to the point of only partially sintering the assemblies. Thus, the assembled elements are sintered to at least about twenty five percent of the total sintering required for the final fuel cell as measured by the shrinkage of the materials required to achieve the final desired densities. Preferably, the assembled elements are sintered to between eighty to one hundred percent of their final densities.

The sintered and densified components are then assembled and bonded in their proper sequences into a monolithic structure or stacked assembly. During the assembly of the densified components, the contacting surfaces are wetted with a bonding agent. The bonding agent is preferably a viscous slurry of anode material or cathode material, and possibly interconnect material, mixed with a compatible binder, plasticizer, and solvent which is brushed or sprayed onto the elements. The selection of the component materials incorporated into the bonding agent is dependent upon the surfaces to be interbonded. To bond two cathode surfaces only cathode materials are used, and similarly to bond an anode surface to an interconnect surface both anode and interconnect materials are used. Similarly, to bond two anode surfaces, only anode materials are used. However, to bond a cathode surface to an interconnect surface both cathode and interconnect materials may be used. By way of example, the bonding agent is formed by combining the selected ceramic component materials with polyvinyl butyryl resin, butyl benzyl phthalate, and isopropyl alcohol into a viscous slurry. Alternatively, the bonding agent may be formed by combining the selected ceramic component materials with materials such as a ceramic paste base, zirconia cement, cellulose-ether compound, a glass-ceramic, or an organometallic solgel material. Platinum ink or platinum powder may also be added to the bonding agent to improve the electrical conductivity within the MSOFC 10.

The stacked assembly including the top and bottom plates 26, 28 is then heat treated, preferably in a furnace or microwave oven 108 operating at temperatures of 1000° C.–1400° C., to sinter and densify the ceramic elements and the bonding agent. By way of example, the assembly is heated at ramp rates of 10°–50° C. per hour to 1200° C. The temperature is maintained at 1200° C. for 1 hour, and then the assembly is allowed to gradually cool down. Microwave heating is preferably carried out at a frequency of twenty eight Giga-Hertz. In this heat treating procedure, the organics and volatile components are burned out or outgassed and the component materials (anode, cathode, electrolyte, interconnect, and gasket) are sintered to bond adjacent contacting surfaces of the previously sintered and densified subassemblies. This two step sintering and densifying process reduces the thermal induced cracking, slumping of the corrugations, and diffusion of the component materials into adjacent layers, while allowing assembly of a monolithic core having a very high number of individual cells. It should be noted that during the assembly of the sintered subassemblies into the stacked monolith and during the heat treating of the monolith, a compressive force may be applied to promote contact and interbonding at the adjacent surfaces.

It should be evident from the foregoing description that the present invention provides many advantages in the field of manufacturing monolithic solid oxide fuel cells. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. A method of fabricating a crossflow solid oxide fuel cell comprising the steps of:
   forming thin tapes of anode, cathode, electrolyte, interconnect and gasket materials;
   shaping said tapes into net shape elements, said anode and cathode elements being shaped to include fuel and oxidant passageways, said interconnect, electrolyte and gasket elements being shaped to include cutouts for fuel and oxidant manifolds passageways;
   assembling and interbonding a plurality of said elements such that said elements are arranged in the sequential and repeated order of an interconnect element, an anode element bounded by an anode gasket element, an electrolyte element, and a cathode element bounded by a cathode gasket element, said cutouts being aligned to form said manifold passageways; and heating the assembled elements to full densification.

2. The method according to claim 1, wherein said electrolyte elements and said interconnect elements are each shaped to define a central core section and a set of manifold sections extending from and integrally connected to said central core section, said manifold sections including said cutouts defining said manifold passageways;

wherein said cathode gasket elements are each shaped to define a pair of header bars which confine the flow of oxidant through said oxidant passageways in said cathode element of said central core section from an oxidant inlet manifold to an oxidant outlet manifold, said header bars also blocking the flow of fuel in said fuel manifolds from contacting said oxidant and said cathode elements;

wherein said anode gasket elements are each shaped to define a pair of header bars which confine the flow of fuel through said fuel passageways in said anode element of said central core section from a fuel inlet manifold to a fuel outlet manifold, said header bars also blocking the flow of oxidant in said oxidant manifolds form contacting said fuel or said anode elements; and wherein said anode and cathode elements are each shaped to fit within the area defined by said central core sections of said electrolyte and interconnect elements and bounded by said respective header bar sections of said anode and cathode gasket elements.

3. The method according to claim 2 wherein said anode gasket elements are formed to have a thickness equal to the total thickness, including fuel passageways, of said anode elements, and said cathode gasket elements are formed to have a thickness equal to the total thickness, including oxidant passageways, of said cathode elements.

4. The method according to claim 2 wherein said gasket elements are formed of zirconia ceramics.

5. The method according to claim 2, wherein said tapes are formed by:

selecting a cermet of cobalt or nickel metal with stabilized zirconia for said anode, strontium-doped lanthanum manganite for said cathode, yttria-stabilized zirconia for said electrolyte, doped lanthanum chromite for said interconnect, and zirconia for said gaskets;

selecting a binder system for compatibility with said anode, cathode, electrolyte, interconnect, and gasket materials, said binder system including a binder and a plasticizer;

mixing separate batches of said anode, cathode, electrolyte, interconnect and gasket materials; and rolling said materials into said tapes.

6. The method according to claim 2 wherein said assembling and interbonding step further comprises a preliminary step of:

assembling and bonding pairs of anode and cathode elements to opposite sides of at least one of said interconnect and electrolyte elements to form a three element stack for assembly into said fuel cell core.

7. The method according to claim 2 wherein said assembling and bonding step further comprises a preliminary step of:

heating said anode elements, said electrolyte elements, said cathode elements, said interconnect elements, and said anode and cathode gasket elements to a temperature sufficient to cause removal of the binder system and at least partial densification of the respective ceramic materials prior to assembling all of said elements.

8. The method according to claim 2, wherein said thin tapes of the individual materials are formed by a process selected from the group consisting of roll milling, extruding, pressing and slurry tape casting.

9. The method according to claim 2 wherein said step of shaping said tapes for said anode and said cathode elements is further characterized by the steps of shaping respective sections of said anode and said cathode elements each into a desired shape selected from the group consisting of corrugated, backfolded, ribbed and finned configurations.

10. A crossflow solid oxide fuel cell comprising:

a plurality of generally planar electrolyte elements having a central core section and manifold sections integrally connected to and extending from said central core section, said manifold sections including cutouts which define manifold passageways for fuel and oxidant to flow through said core section;

a plurality of generally planar interconnect elements having a central core section and manifold sections integrally connected to and extending from said central core section, said manifold sections including cutouts which define said manifold passageways for fuel and oxidant to flow through said core section;

a plurality of cathode elements positioned proximate said core section portions between alternate spaces defined by stacked pairs of said pluralities of interconnect and electrolyte elements, each said cathode element including oxidant passageways extending between opposite ends of said cathode element;

a plurality of oxidant gasket elements bounding said cathode elements to define said oxidant manifold passageways, each said oxidant gasket element including a pair of header bars which confine the flow of oxidant through said oxidant passageways in said central core section, said header bars also blocking the flow of fuel in said fuel manifolds from contacting said oxidant and said cathode elements;

a plurality of anode elements positioned proximate said core section portions between alternate spaces defined by stacked pairs of said pluralities of interconnect and electrolyte elements, each said anode element including fuel passageways extending between opposite ends of said anode element, said fuel passageways being orthogonal to said oxidant passageways; and a plurality of anode gasket elements bounding said anode elements to define said fuel manifold passageways, each said anode gasket elements including a pair of header bars which confine the flow of fuel through said fuel passageways in said central core section, said header bars also blocking the flow of oxidant in said oxidant manifolds from contacting said fuel and said anode elements.

11. The solid oxide fuel cell according to claim 1 wherein said anode gasket elements are formed to have a thickness equal to the total thickness, including fuel passageways, of said anode elements, and said cathode gasket elements are formed to have a thickness equal to the total thickness, including oxidant passageways, of said cathode elements.

12. The solid oxide fuel cell according to claim 1 wherein said cathode and anode gasket elements are formed of zirconia ceramics.

13. The solid oxide fuel cell according to claim 1 wherein said elements further comprise:
   a cermet of cobalt or nickel metal with zirconia for said anode;
   strontium-doped lanthanum manganite for said cathode;
   stabilized zirconia for said anode gasket and said cathode gasket;
   yttria-stabilized zirconia for said electrolyte; and
   lanthanum chromite doped with a compound selected from the group consisting of magnesium, calcium cobalt, and strontium, for said interconnect.

14. The solid oxide fuel cell according to claim 1 wherein said plurality of passageways in said anode and said cathode elements are defined by forming said anode and said cathode elements to a shape selected from the group consisting of corrugated, backfolded, ribbed and finned configurations.

* * * * *